Nov. 11, 1924.

J. A. McKINZIE

HAYSTACKER

Filed March 24, 1923

1,515,351

INVENTOR:
Joseph A. McKinzie
BY A. M. Carlsen
ATTORNEY.

Patented Nov. 11, 1924.

1,515,351

UNITED STATES PATENT OFFICE.

JOSEPH A. McKINZIE, OF KIMBALL, MINNESOTA.

HAYSTACKER.

Application filed March 24, 1923. Serial No. 627,304.

*To all whom it may concern:*

Be it known that I, JOSEPH A. McKINZIE, a citizen of the United States, residing at Kimball, in the county of Stearns and State of Minnesota, have invented certain new and useful Improvements in Haystackers, of which the following is a specification.

My invention relates to hay stacking devices and the object is to provide a simple and efficient device for building up straw stacks of the usual height and of any length as may be required.

In the accompanying drawing;—

Figure 1:
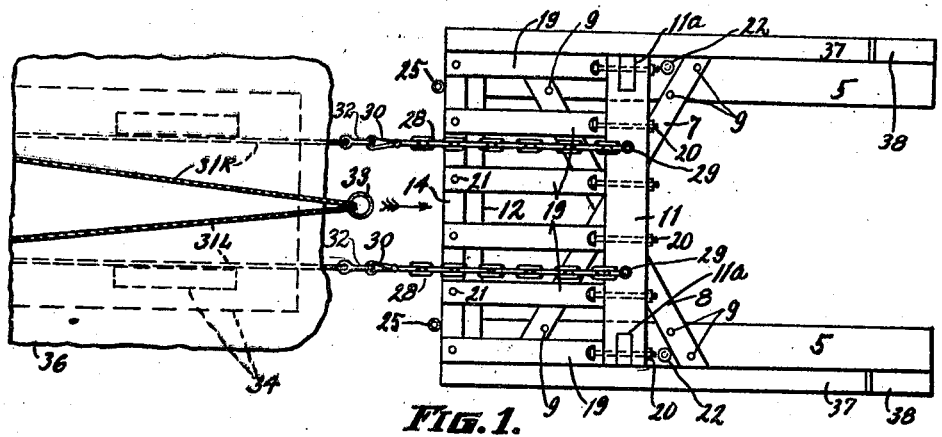
Fig. 1 is a top view of my device in its operative position about to unload hay preparatory to stacking it.

Referring to the drawing by reference numerals, my device comprises preferably a skeleton frame made of timbers and for best results its dimensions are approximately sixteen feet length, twelve feet width and eight feet height, but it is understood that for exceptional cases such dimensions may be varied.

The device comprises two parallel, spaced skids 5, each having its forward end curved upwardly on its lower side as at 6, the skids being braced and held in parallel relation by two crossed braces 7 and 8 secured as with bolts 9 on the top of the skids.

Figures 2, 3:
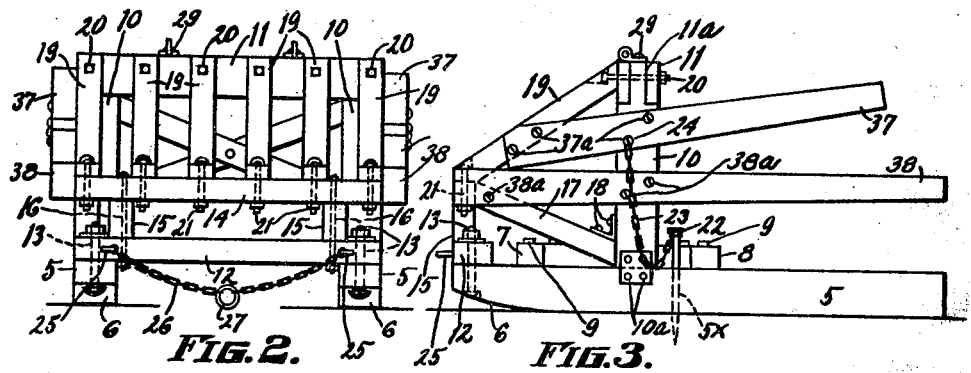
Fig. 2 is a front view of the stacker only some minor parts being omitted.
Fig. 3 is a left side view of the stacker.
Figure 4:
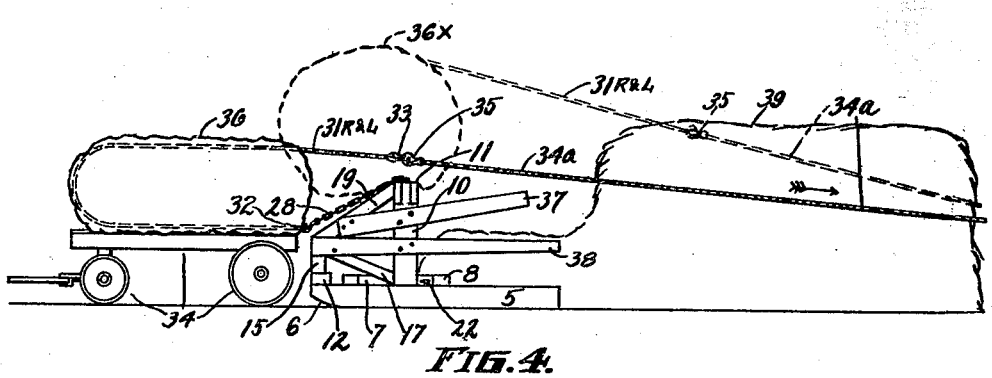
Fig. 4 is a side view of my hay stacker, a stack of hay being built up with it and a hay rack in position to be unloaded.

A little forward of the center of the skids, that is to the left of the center in Figs. 1, 3 and 4, I secure as at 10ª on each of them a post 10, the tops of the two transversely registering posts connected by a timber 11 the top surface of which is preferably about 8 feet above the ground. Said uprights and the cross member may be rabbeted as at 11ª. The front ends of the skids are connected by a timber 12, secured with bolts 13. Another timber 14 is spaced vertically above timber 12 by separators 15 and all four of them (12, 14 and 15) are suitably bolted together by bolts 16, the design being such that the top of member 14 is preferably about four feet above the ground. A bracing timber 17 may be bolted as at 18 to the lower end of each post 10 and the front end of each brace suitably secured (not shown) to the rear side of timber 14.

In the upper front part of the frame I provide a number of transversely spaced parallel bars 19 extending the width of the frame and from the upper front edge of timber 11 to the upper front edge of the timber 14, all in a common inclined plane as best shown in Figs. 2 and 3. Said bars have their rear ends secured to the timber 11 with bolts 20 and their front ends secured to timber 14 as with bolts 21.

22 are anchoring pegs of a shape resembling a large nail and adapted to be slidably inserted, one in each skid in a vertical bore 5ˣ (Fig. 3) and may be driven into the ground to hold the device wherever desired. The pegs are merely drawn out of the ground by their heads when it is desired to move the device. To prevent loss of the pegs or stakes 22 I provide a light chain 23 for each of them secured with one end to the stake and the other end to any part of the device, as bolt 24 in Fig. 3.

25 are two eye-bolts secured in the front part of my device and holding the two ends of a chain 26 having a central ring 27 adapted to be engaged by a tractor or other draft means for pulling the device to any desired location.

28 are two heavy chains, each with its rear end secured to a bolt 29 in the timber 11 and its front end provided with a snap hook 30 adapted to engage a hay sling. Said hay sling comprises two cables 31ᴿ and 31ᴸ, a ring 33 engaged by two ends of the cables normally forward of the stacker, the other ends of the said cables having rings 32. Such a sling is laid on the bottom of a hay rack 34 with the two cables in transversely spaced relation and the rings 32 rearward of the rack. When the rack has been loaded with hay the forward or free end of the sling is cast over the top of the load and rearwardly, (longitudinally) so that ring 33 will be above the rings 32 at the rear end of the load.

In the use of my device, it is first anchored in place by driving the stakes 22 in the ground, then a hay rack loaded as above described is backed up in front of the device, after which the snap hooks are engaged with the rings 32 of the hay sling. A stout rope or cable 34ª having a snap hook 35 (see Fig. 4) is then secured to the ring 33 of the sling and any suitable power used to pull the rope 34ª rearwardly from the stacker. The load of hay, numbered 36 in Fig. 4, is moved rearwardly off of the hay rack, onto the inclined plane of the stacker and a continued pull on the cable brings the whole load of hay up the incline to position 36ˣ from which position a further pull will cause the hay to drop down between the skids 5.

37 are upper longitudinally arranged side guards and 38 similar lower guards secured respectively as with bolts 37ᵃ and 38ᵃ to the upright parts of the device. Such guards prevent the hay from sagging to either side. Successive unloadings of hay will build up a stack 39 to any desired height and the stack may be of any length. After the desired height of stack has been attained the device is moved forward a few feet so that another section may be added to the stack.

What I claim is:—

1. In a portable hay stacker of the class described, two parallel skids held in fixed relation, a fixed vertically arranged rectangular frame mounted transversely on the front ends of the skids, a similar but higher frame mounted on the skids rearward of the first frame, an inclined frame extending from the lower to the higher frame, a hay sling, means secured to the highest frame for engaging the hay sling, further means for drawing a load of hay within said sling up the said incline to its highest point and thence dropping the hay between the skids, and means guiding the falling hay to a position between said skids.

2. The structure specified in claim 1, in which said guiding means consists of a number of vertically spaced bars above each skid and extending rearwardly from the upright transverse frames.

In testimony whereof I affix my signature.

JOSEPH A. McKINZIE.